Sept. 8, 1942.   L. GABRILOVITCH   2,295,207
SELECTION OF WAVES HAVING SUPERPOSED FREQUENCIES Filed July 28, 1939

Inventor
Leonide Gabrilovitch

By Frank H. Borden
Attorney

Patented Sept. 8, 1942

2,295,207

UNITED STATES PATENT OFFICE 2,295,207

SELECTION OF WAVES HAVING SUPERPOSED FREQUENCIES

Leonide Gabrilovitch, Paris, France

Application July 28, 1939, Serial No. 287,100
In France July 29, 1938

11 Claims. (Cl. 250—20)

It is possible to separate two modulated waves, the frequency bands of which are partly or entirely superposed, by feeding said waves into the cathode-anode circuit of a push-pull arrangement of triodes the anodes of which are under variable tension and hereinafter generally designated as diodes provided with grids to distinguish from ordinary triodes and at the same time making the carrier of the modulated wave it is desired to eliminate act on the grids of the two tubes forming said push-pull arrangement. This method of selection has been described by the applicant in his U. S. Patent application Ser. No. 145,622, filed May 29, 1937, now matured into Patent No. 2,240,500, dated May 6, 1941.

The theoretical bases of the method in question are explained in a paper communicated to the Académie des Sciences of Paris, dated 22nd November 1937 (see report of the meetings of the Académie des Sciences of Paris, vol. 205, pages 969–971).

Now, it is possible to prove theoretically (and experiment appears to confirm completely the analytical results) that the method of selection, such as it is defined in the above mentioned patent, can only be applied to a pair or a couple of modulated waves and would not give the same result in the case in which it is proposed to separate three or more waves.

In fact, it is easy to prove that when three or more modulated waves of different frequencies or of the same frequency but of different phases, are fed into the cathode-anode circuit of a push-pull arrangement of diodes provided with grids and when the two grids contained in the push-pull arrangement are at the same time subjected to the action of the same variable voltage (corresponding to the carrier of the modulated wave it is desired to eliminate), all the modulated waves that are retained (that is to say that are relatively slightly weakened) will be of the same frequency and of the same phase at the output of the push-pull circuit, so that it will no longer be possible to effect any separation of said waves.

The purpose of the present invention is to overcome this drawback and to make it possible to apply the method of selection described by the applicant in his above mentioned patent and also in his paper communicated to the Académie des Sciences not only to two modulated waves, but in general to any number of such waves.

The means which has to be used for obtaining this result consists in feeding on to the two grids contained in the push-pull arrangement of diodes provided with grids, two different variable voltages instead of the same variable voltage, for example two voltages which are calculated as follows:

Let $$Q \sin \omega t$$

be the expression of the carrier of the modulated wave it is desired to eliminate.

In the methods hitherto described by the applicant, $Q \sin \omega t$ is applied either in its sinusoidal form or in its rectified form $Q|\sin \omega t|$ to the two grids contained in the push-pull circuit.

In order to obtain the separation of a plurality of waves, the following method is adopted:

The grid of the first tube of the push-pull circuit is subjected to the action of one of the two alternations of the (continuous) carrier wave $Q \sin \omega t$, whereas the grid of the second tube is subjected to the action of the second alternation of the same carrier wave.

It is useful (if not necessary) for each of the two alternations to be used in the form of its absolute value taken with the minus sign, that is to say in the form $$-Q|\sin \omega t|$$

In order to give a concrete idea, let it be assumed that the voltage $$-Q|\sin \omega t|$$

is applied to the grid of the first tube during the intervals of time located between $$t_c = \frac{2k\pi}{\omega} \text{ and } t_f = \frac{(2k+1)\pi}{\omega}$$

$k$ being any whole number. Under these conditions, arrangements must be made so that the grid of the second tube is subjected to the action of the voltage $$-Q|\sin \omega t|$$

during the intervals of time located between $$t_c = \frac{(2k+1)\pi}{\omega} \text{ and } t_f = \frac{(2k+2)\pi}{\omega}$$

(wherein $t_c$ designates the beginning of an interval, and $t_f$ the end thereof).

In the accompanying drawing forming part of this description, Fig. 1 represents a diagram of the curves of the voltages acting upon the respective grids of the two tubes of a push-pull arrangement.

Figure 1:
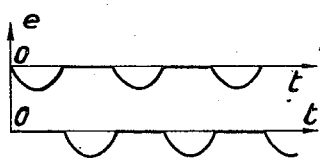

The curve of Fig. 1 shows the voltages which act on the grids of two tubes.

The time is plotted as abscissae and the voltages $\theta$ applied to the grids as ordinates.

It can be seen that each of the grids is subjected to an intermittent energization and that during any interval of time while one of the two grids is energized, the other remains at zero potential (that of the frame or of the ground).

Figure 2:
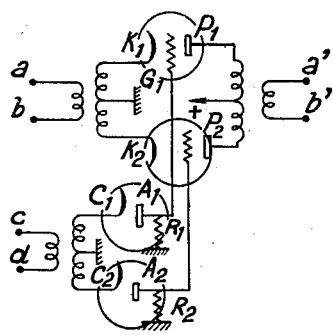
Fig. 2 represents an illustrative partial circuit diagram of the system by means of which intermittent energization of the grids is secured.

Fig. 2 shows diagrammatically the circuit to be used in order to obtain said intermittent energization of the two grids.

In this figure, $a$ and $b$ designate the input terminals of the cathode ($K_1$ and $K_2$)-anode($P_1$ and $P_2$) circuit of the push-pull arrangement of diodes provided with grids.

The grids $G_1$ and $G_2$ of this push-pull arrangement are intermittently energized by means of a rectifying device comprising two simple diodes or one double diode containing two separate cathodes $C_1$ and $C_2$ and two separate plates $A_1$ and $A_2$.

A sinusoidal voltage of the form $Q \sin \omega t$ (wherein $Q$ is a constant) is applied across the input terminals $c$ and $d$ of the rectifying device. The cathodes $C_1$ and $C_2$ of the two diodes are fed through a transformer whereof the secondary is grounded at its centre point.

Under these conditions, the two diodes operate in turn; the first allowing one of the alternations of the voltage $Q \sin \omega t$ to pass, whereas the second allows the other alternation to pass. The output voltages which appear at the ends of the resistances $R_1$ and $R_2$ represent the absolute values of the two alternations (taken with the minus sign since $R_1$ and $R_2$ are inserted between the ground and the plates of the two diodes).

Figure 3:
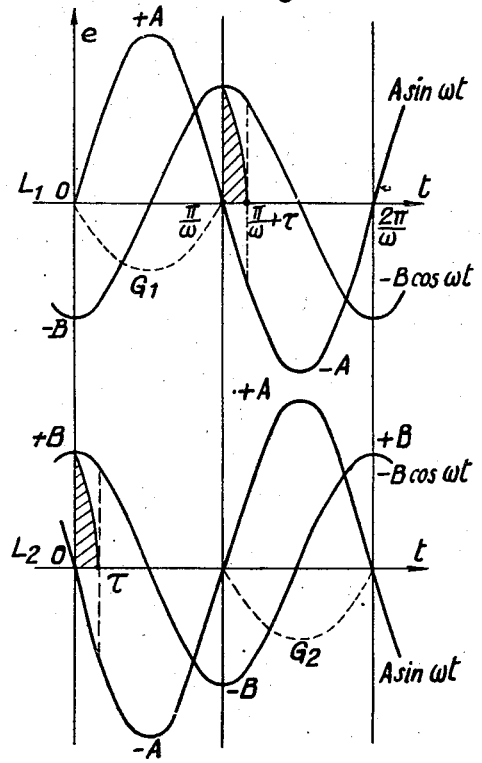
Fig. 3 represents an illustrative schematic diagram of the curves of the potentials impressed upon the respective grids of a push-pull arrangement according to the invention.

The curve of Fig. 3 shows the differences of potential between the anodes and the cathodes of the two tubes ($L_1$ and $L_2$) which form the push-pull arrangement of diodes provided with grids (curve in full lines) and also the voltages applied to the grids $G_1$ and $G_2$ of said tubes (curves in dotted lines).

All the curves have been plotted assuming that the cathode-plate circuit of the push-pull arrangement of the diodes provided with grids is fed by the sum of two waves which are both of the same frequency but are $\pi/2$ out of phase.

The upper curve (which relates to the first tube $L_1$) represents the difference of potential which appears between the anode and the cathode of the first tube and also the voltage applied to its grid. There are shown therein (drawn in full lines) the differences of potential $A \sin \omega t$ and $B \cos \omega t$ which appear between the anode and the cathode and (drawn in dotted lines) the absolute value of the first alternation of the wave taken with the minus sign, this voltage being applied to the grid $G_1$.

The lower curve (which relates to the second tube $L_2$) shows the differences of potential $A \sin \omega t$ and $B \cos \omega t$ with a lag of $\pi$ and also an intermittent energization applied to the grid $G_2$ during the intervals of time when the grid $G_1$ remains at zero potential.

If it is assumed, as a first approximation, that while $G_1$ or $G_2$ is energized, the corresponding tube (either $L_1$ or $L_2$) is completely blocked, it will immediately be seen that each of the tubes will only allow the hatched portions of the curves to pass.

This hypothesis may be considered to be borne out in practice in all the cases in which the voltages which are applied to the two grids of a push-pull arrangement reach high values. A series of experiments made on a push-pull arrangement comprising American 42 tubes, has shown that when the mean value of the voltage applied to each of the grids approaches 20 volts, the action of the intermittent energization of the grids may be considered to be an intermittent blocking of the corresponding tubes.

As regards the general case (that is to say the case in which the effect of the intermittent energization of the grids is not equal to a simple intermittent blocking of the corresponding tubes) it can easily be proved that from the standpoint of selection, this case gives in practice the same results as those which would be produced by an operation strictly in accordance with the hypothesis of intermittent blocking.

Figure 4:
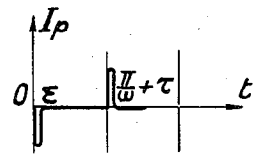
Fig. 4 represents a curve with the output of current from the push-pull circuit of Fig. 3.

Now, if the operation of the push-pull arrangement is considered as an intermittent blocking of each of the two tubes which it comprises, said tubes being blocked in turn, it will readily be realized that the current $I_p$ at the output of the push-pull circuit will have the form shown in Fig. 4.

In order to see it, it suffices to examine the two curves of Fig. 3, taking into account the hypothesis that the tube $L_1$ is blocked during the interval of time $(0, \pi/\omega)$ and that said tube operates normally during the interval $(\pi/\omega, 2\pi/\omega)$, whereas the tube $L_2$ operates normally during the interval $(0, \pi/\omega)$ and is blocked during the interval $(\pi/\omega, 2\pi/\omega)$.

It follows from this hypothesis that during the interval $(0, \pi/\omega)$ no current passes through the tube $L_1$, whereas a current will flow through the tube $L_2$ so long as the expression $$A \sin \omega t + B \cos \omega t$$

remains negative. In fact, so long as $$A \sin \omega t + B \cos \omega t \leqq 0$$

the difference of potential between the anode and the cathode of the tube $L_2$ remains positive and a current flows through the tube in question.

This operative period starts at the instant $t=0$ and finishes at the instant when $$A \sin \omega t + B \cos \omega t = 0$$

that is to say when $$A \sin \omega t = -B \cos \omega t$$

These equations enable the width of the hatched zone to be calculated immediately, which width is designated by $\tau$ in Fig. 3.

As regards the interval of time $(\pi/\omega, 2\pi/\omega)$, it is characterized by the complete blocking of the tube $L_2$ and by the fact that during the period between $\pi/\omega$ and $\pi/\omega + \tau$, the tube $L_1$ allows a current of the form $A \sin \omega t + B \cos \omega t$ to pass.

This simple consideration enables a method of calculation to be established which is of a nature to throw light on the mechanism which is at the basis of the operation the "intermittent blocking" push-pull circuit.

The chief results that can be found by means of this calculation are as follows:

(1) An intermittent blocking push-pull circuit to which are applied two modulated waves of different carrier frequencies or of the same carrier frequency but of different phases, enables any one of said two waves to be eliminated according to the experimenter's choice and the other to be retained.

In this respect, the intermittent blocking push-pull circuit produces the same results as the "ordinary" push-pull arrangement of diodes provided with grids, described by the applicant in his above mentioned patent.

(2) If two modulated waves, the carriers of which are of the same frequency but of different phases, are applied to an intermittent blocking push-pull arrangement and if one of said waves is eliminated, the wave which is retained will be of a phase whereof the value is determined not only by the phase of the voltage applied to the grids of the push-pull arrangement but also by the initial phase of the carrier of the modulated wave which is retained.

In this respect, there exists a capital difference between the ordinary push-pull arrangement with identical energization of the two grids and a push-pull arrangement with intermittent energization, in which the two grids are energized in turn.

In fact, when two modulated waves of the same frequency but of different phases are applied to the first push-pull arrangement, and when the grids of said push-pull arrangement are subjected to the action of the carrier of the modulated wave it is desired to eliminate, a wave will be obtained at the output of the push-pull circuit, whereof the carrier will always have one phase $$\frac{\pi}{2}$$

out of phase with that of the oscillation applied to the grids. On the contrary, if the same two waves are applied to a push-pull arrangement with intermittent energization, the wave obtained at the output (after suppressing the wave to be eliminated) will be of a phase which is not equal to that of the oscillation applied to the grids, but which will vary according to the initial value of the phase of the wave it is desired to retain.

(3) When the two modulated waves to be separated are of different frequencies, the difference between the two push-pull arrangements appears in the fact that in the push-pull arrangement with identical energization of the two grids, the frequency of the wave obtained at the output will always be equal to that of the oscillation applied to the grids, whereas in the push-pull with intermittent energization, the frequency of the retained wave will vary according to the variations of the initial frequency of the wave to be retained.

(4) In the case in which three modulated waves whereof the carriers are all three of the same frequency but of different phases, are applied to a push-pull with intermittent energization, it is possible to eliminate one of the three modulated waves in question and under these conditions two modulated waves whereof the carriers are of different phase, are obtained at the output of the push-pull circuit. This makes it possible to continue the selection by eliminating by means of a second push-pull arrangement one or the other of the two waves retained by the first, and thus to isolate one of the three modulated waves forming the initial incoming aggregate.

(5) When three modulated waves of different frequencies and having different carriers are applied to a push-pull arrangement with intermittent energization, it is possible to eliminate one of these three waves and to retain the two others. The frequencies of the waves which are retained will in this case be determined not only by the frequency of the oscillation applied to the grids, but also by the initial frequencies of the waves to be retained.

It follows from the foregoing that the use of a plurality of push-pull arrangements of diodes provided with grids with intermittent energization, enables, in an aggregate of three or more modulated waves whereof the carriers are all of the same frequency but of different phase, any one of said modulated waves to be separated by eliminating all the others.

It appears to be very probable a priori (and experiment confirms these theoretical forecasts) that in order that the selection shall take place in a sure and regular manner, it is necessary for the initial phases of the waves to be selected to be sufficiently different from each other. The experiments which have been carried out in this connection have shown that a minimum difference of about 15° is necessary in order to guarantee a selection that may be considered to be completely efficient and stable.

The method of selection above described comprises the successive elimination of all the waves forming the incoming aggregate with the sole exception of the one it is desired to receive.

This means that, according to said method, the undesirable modulated waves are eliminated one after the other so that the entire selection of $n$ waves involves $(n-1)$ successive operations, that is to say $(n-1)$ selections, each of which is effected by a push-pull arrangement of diodes provided with grids such as described.

The first of these operations eliminates one of the undesirable waves, so that at the output of the first push-pull arrangement, there remains in all $(n-1)$ modulated waves whereof $(n-2)$ are undesirable waves.

The second operation eliminates one of the undesirable waves in this new aggregate, so that at the output of the second push-pull arrangement, there remains in all $(n-2)$ modulated waves whereof $(n-3)$ are undesirable waves, and so forth.

After $(n-1)$ operations, the aggregate at the output of the $(n-1)$th push-pull arrangement will only contain a single wave, viz. the modulated wave it is desired to receive.

This method may be carried out in a substantially simplified manner which consists in eliminating in a single operation $(n-1)$ undesirable waves from an incoming aggregate containing $n$ waves in all.

The selecting instrument in this case remains the same, viz. a push-pull arrangement of diodes provided with grids, wherein the two grids are energized in turn in an intermittent manner, so that while the first grid is energized by the first alternation of a continuous oscillation, the second grid is at zero potential, and while this second grid is energized by the second alternation of the same continuous oscillation, the first grid remains inoperative (see Fig. 1).

The manner in which the push-pull arrangement behaves with respect to the incoming aggregate depends on the choice of the continuous oscillation which is fed on to the grids of the push-pull arrangement or more accurately on the choice of the phase of said oscillation.

In the above described process, the energization of the grids of each push-pull arrangement is effected by means of a continuous oscillation which is accurately synchronized with the carrier of the modulated wave which is to be eliminated by the push-pull arrangement in question, that is to say by means of an oscillation of the same frequency and of the same phase as this carrier wave.

If, instead of synchronizing the continuous oscillation, which is used for energizing the grids of a push-pull arrangement of diodes provided with grids, with the carrier of one of the modulated waves forming part of the incoming aggregate, the phase of the oscillation in question is appropriately chosen, all the modulated waves contained in the incoming aggregate can be weakened in a very substantial manner, with the sole exception of the one it is desired to receive. This result can be foreseen by theory, and experiment proves that it can be obtained in a fairly simple manner by subjecting the continuous wave used for energizing the grids of the push-pull arrangement, to the action of a dephasing device which is capable of varying the phase in a continuous manner.

When a plurality of modulated waves, all of the same frequency but of different phases, act on the cathode-anode circuit of a push-pull arrangement of diodes provided with grids, and when the two grids of this push-pull arrangement are fed in turn (and in an intermittent manner) with a continuous oscillation of the same frequency as the modulated waves to be separated, it will always be possible, by means of an appropriate dephasing device, to adjust the phase of the continuous oscillation in question in such a manner that all the modulated waves forming the incoming aggregate, with the sole exception of the modulated wave to be received, will be considerably weakened.

This manner of proceeding enables the method of selection above explained to be considerably simplified; in fact, it enables a plurality of undesirable waves to be eliminated at once from an incoming aggregate, without it being necessary to have recourse, for this purpose, to a plurality of successive operations each of which eliminates one of the undesirable waves. For example, if the incoming aggregate is formed by $n$ modulated waves ($n-1$ of which are undesirable), it will no longer be necessary in this case to have $n-1$ push-pull arrangements of diodes provided with grids, in order to eliminate these $n-1$ disturbing waves one after the other; the same result can be obtained by using only one push-pull arrangement of diodes provided with grids and energizing the grids of said push-pull arrangement in a suitable manner.

However, as the mechanism of the selection depends on the strength of the modulated waves forming the aggregate to be separated, or more accurately on the ratio between the amplitude of the wave to be eliminated and that of the wave to be retained, it is necessary to take steps which enable the amplitudes of the waves forming the incoming aggregate to be adjusted.

It is obvious that this adjustment of amplitudes can only consist of the variation of the amplitudes of the carrier waves, which variation automatically changes the respective depth of the modulations. Now, in order to vary the amplitudes of the carriers, it is only necessary to add to the incoming aggregate continuous oscillations of the same frequency and of the same phase as the carrier wave whereof it is desired to increase the amplitude.

This manner of proceeding may be designated by the expression "injection of the carrier waves."

In the case in which it is required to eliminate a plurality of modulated waves simultaneously, it is necessary as shown by theory, to increase the amplitudes of the carriers of all the modulated waves it is desired to eliminate, relatively to the amplitude of the carrier of the wave it is desired to retain. This operation may be effected by separating the carrier waves in question, for example by means of quartz filters or of amplifiers provided with negative reaction, by suitably amplifying the continuous oscillations thus obtained and adding the product of this amplification to the original incoming aggregate.

Figure 5:
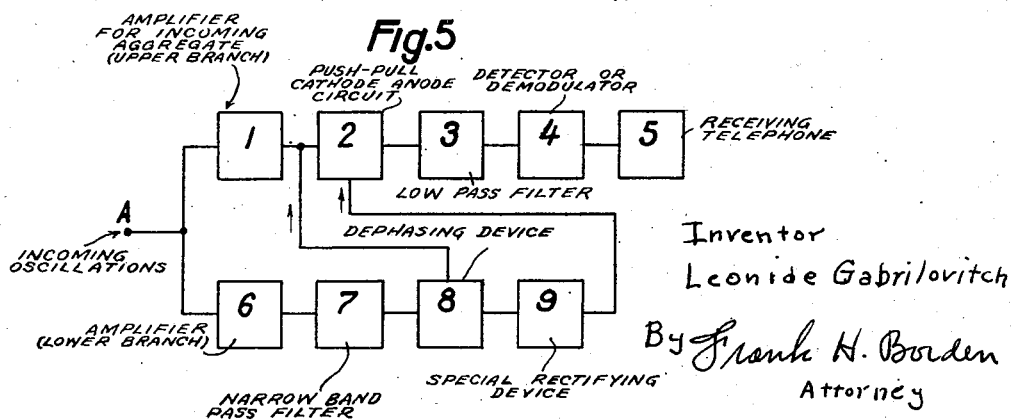
Fig. 5 represents a schematic diagram of the circuit and its components in a system typical of the invention.

Fig. 5 shows, by way of example, one of the possible embodiments of the method which has just been described.

In this drawing, A represents the output end of the cable, or, in the case of a radio receiver, a collector of the incoming oscillations (for example, the antenna).

From A, the receiving devices are divided into two branches and the upper branch 1 represents an amplifier through which the incoming aggregate is fed.

2 represents a push-pull arrangement of diodes provided with grids, the cathode-anode circuit of which is subjected to the action of the aggregate issuing from the amplifier 1.

The product of the operation of the push-pull arangement 2 is fed into a low-pass filter 3 which cuts off all the frequencies which are equal to and greater than double the carrier frequency; said filter is adapted to cut out the harmonics of the carrier which are produced by the operation of the push-pull arrangement 2. When it issues from the filter 3, the product of the filtering is fed into a detector or demodulator 4 and the product of the demodulation or of the detection acts on a receiving telephone 5.

In the parallel branch, 6 represents an amplifier, 7 represents a band-pass filter passing a very narrow band (for example, a quartz filter or an amplifier provided with negative reaction); this device is intended to eliminate the carrier frequency from the incoming aggregate which issues from the amplifier 6. When it has been separated, said carrier frequency is fed into the dephasing device 8 by means of which the phase of said frequency is appropriately adjusted before adding it to the incoming aggregate at the input of the cathode-anode circuit of the push-pull arrangement 2.

The carrier frequency which has been dephased by the device 8 is at the same time fed into a special rectifying device 9 shown in Fig. 2. The alternations of the continuous oscillation are fed in turn on to the two grids of the push-pull arrangement 2.

The operation of the arrangement thus formed does not require to be explained, since its mechanism is made obvious by what has been explained above.

I claim:

1. A process for the selection of modulated waves having superposed frequency bands and overlapping side bands, by a system having a push-pull arrangement of triodes with variable tension on the anodes designated as diodes provided with grids, which consists in impressing the sum of the modulated waves upon the system, energizing the grids of the diodes in turn, and in modifying the operation of each grid by intermittently subjecting it to the action of one of the alternations of the carrier of the wave to be eliminated.

2. A process for the selection of modulated waves having superposed frequency bands and overlapping side bands by a system having $n-1$ push-pull arrangements of triodes with variable tension on the anodes designated as diodes provided with grids, in a system in which $n$ represents the total incoming waves, which consists in impressing $n$ waves upon the system, energizing the grids of the diodes in turn, subjecting each push-pull arrangement to the action of the carrier of the wave to be eliminated to modify the operation of each grid, each respective push-pull arrangement being operative to eliminate one of the $n$ incoming waves until only one of the $n$ waves remains.

3. A process for the selection of modulated waves having superposed frequency bands and overlapping side bands, by a system having a cathode-anode circuit of a push-pull arrangement of triodes with variable tension on the anodes designated as diodes provided with grids, which consists in impressing the sum of the modulated waves upon the systems, energizing the grids of the diodes in turn, and in modifying the operation of each grid by intermittently subjecting it to the action of one of the alternations of the carrier of the wave to be eliminated, and in feeding the aggregate to be separated into the circuit, whereof the two grids are energized in turn and in an intermittent manner by the alternations of a continuous oscillation of the same frequency as the carrier of the modulated wave to be separated and of suitably chosen phase.

4. A process according to claim 3 characterized in that, before feeding the aggregate to be separated into the circuit, the carriers which have been separated from the modulated waves to be eliminated are injected into said aggregate.

5. A process for selection of modulated waves with overlapping or entirely superposed sidebands by a system having a cathode-anode circuit of a push-pull arrangement of triodes with variable tension on the anodes designated as diodes with grids and comprising two receiving circuits mounted in the push-pull arrangement, consisting in feeding the incoming plurality of modulated waves to be separated into said receiving circuits passing through one circuit at any moment only positive tensions impressed upon the input of the arrangement, passing through the other circuit at any moment only negative tensions impressed on said input, periodically blocking both circuits in turn in such a manner that during any interval of time while one of the two circuits is able to perform the second is blocked and vice versa; whereby, pursuant to predetermining the frequency and the phase of the periodical blocking, to attenuate and to dephase in different proportions the different modulated waves forming the incoming aggregate.

6. A process for selecting modulated waves with overlapping or superposed side-bands, by a system having a cathode-anode circuit of a push-pull arrangement of triodes with variable tension on the anodes designated as diodes with grids and comprising two parallel translating branches, which consists in feeding the incoming plurality of said waves through the branches, in periodically blocking and deblocking each of the two branches with the same frequency as the carrier of the wave to be received and of appropriate phase in such a way that to any period of blocking in one branch there is a corresponding period of free passage in the other branch and vice-versa whereby the waves are intermittent and alternate in each branch, and in timing the duration of the intervals of functioning of each branch so that either of the two branches passes the waves to be translated exclusively during the intervals of time when the resultant of its input tensions has a positive value; in combining the products of the functioning of said two branches in opposition so as to form a sequence of impulses being, by turn, positive and negative, filtering the sequence, reconstituting the modulated waves forming the initial incoming plurality, modifying the proportions of amplitudes of said waves, their rates of modulation and their phases in a non-uniform manner, which modifications are controlled first by the phase of the periodical blocking and deblocking and second by the proportions of amplitudes of the carriers of the incoming waves.

7. A process for selecting modulated waves with overlapping or superposed side-bands by a system having a cathode-anode circuit of a push-pull arrangement of triodes with variable tension on the anodes designated as diodes with grids and comprising two parallel translating branches and a variable resistor element, which consists in feeding the incoming plurality of said waves through the branches, in periodically blocking and deblocking the variable resistor in accordance with a determined rhythm, the frequency of this periodic blocking and deblocking being the same as that of the carrier of the wave to be received, while the phase of this periodical variation is appropriately chosen; in blocking the two parallel branches in turn and intermittently whereby each passes the incoming plurality of waves exclusively first when the corresponding resistor element is deblocked and second in such periods of free passage, during the intervals of time when the resultant of the input tension in the particular branch has a positive value; in combining the products of the two branches in opposition so as to form a sequence of alternating negative and positive impulses, in filtering said sequence and reconstituting the incoming plurality of modulated waves, in modifying the proportions of amplitudes of these waves as well as their phases with respect to the initial proportions and phases, the character and magnitude of which modifications are determined first by the phase of the periodical blocking and deblocking and second by the proportions of amplitudes of the carriers of incoming modulated waves established at will at the input of the two branches.

8. A process for selecting modulated waves with overlapping of superposed sidebands in accordance with the system and steps of claim 6 in which variable resistor elements comprising two periodically biased thermionic tubes are in the respective branches, characterized more particularly by the production of periodical biasing by applying to one of the electrodes of said tubes a variable negative tension provided by an appropriate rectification of a continuous oscillation having the same frequency as the carrier of the wave to be received and a convenient phase.

9. A process for selecting modulated waves in accordance with the system and steps of claim 6 in which variable resistor elements comprising two periodically biased thermionic tubes, each comprising at least one anode, one cathode and one grid, so mounted that there is no constant tension applied to their anodes, are disposed in the respective branches and, characterized more particularly by impressing a plurality of waves on the circuit of any of said tubes, whereby this plurality can be transmitted through same exclusively during the intervals of time when the resultant of the input tensions of the particular branch has a positive value; the periodical blocking of said tubes being effected by applying to their grids a variable negative tension provided by appropriate rectification of a continuous oscillation having the same frequency as the carrier of the wave to be received and a convenient phase.

10. A process for selecting modulated waves in accordance with the system and steps of claim 6 in which variable resistor elements comprising two periodically biased thermionic tubes, each comprising at least one anode, one cathode and one grid, so mounted that there is no constant tension applied to their anodes, are disposed in the respective branches and a band pass filter of predeterminedly narrow passing band, characterized more particularly by the feature that the oscillation which after appropriate rectification provides the negative tension effects the periodical blocking of the two branches, which oscillation has the same frequency as the carrier of the wave to be received, then filtering out the plurality of incoming waves by means of the band pass filter.

11. In a device for receiving modulated waves two parallel receiving circuits mounted in push-pull connections and each formed by a triode with variable tension on the anode designated as a diode provided with a grid, these said two grids being energized in turn so as to block periodically said two diodes, the blocking being effected in turn so that at any moment when one of the diodes is blocked the second is able to perform and vice versa; a rectifying device for energizing the two grids by continuous oscillations fed thereto, which impresses one rectified alternation of the said continuous oscillation on one of the two grids and the second rectified alternation on the second grid, and a dephasing device for adjusting the phase of the continuous oscillation in question.

LEONIDE GABRILOVITCH.